May 30, 1967 S. LUZAICH 3,322,247
TRANSMISSION AND CLUTCH WITH SINGLE CONTROL
Filed July 19, 1965 5 Sheets-Sheet 3
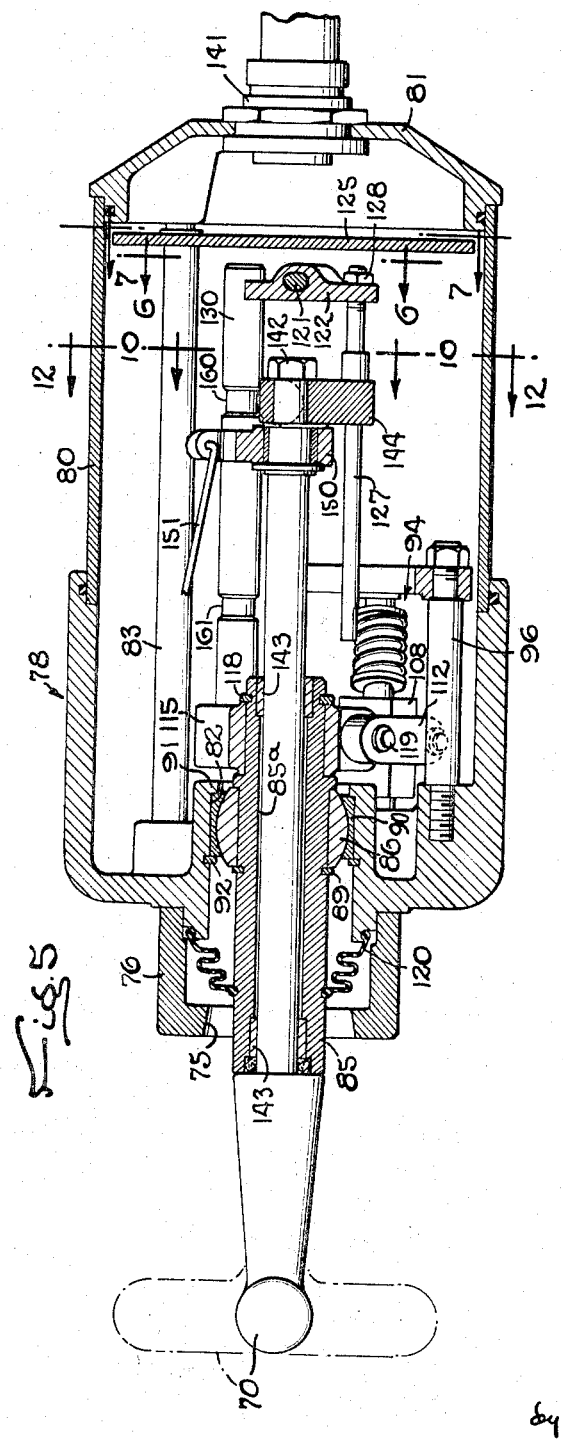
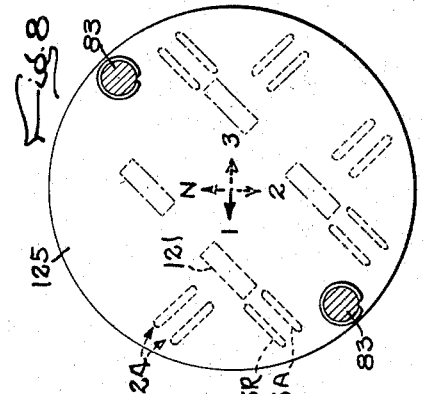
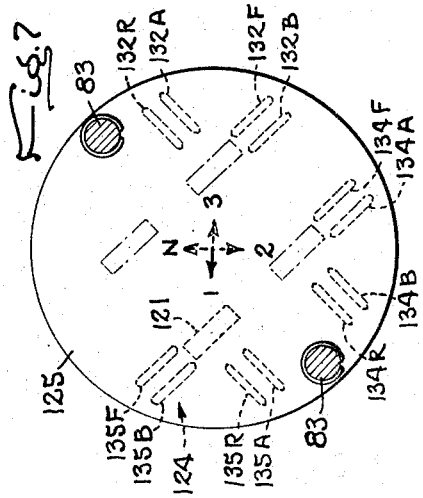
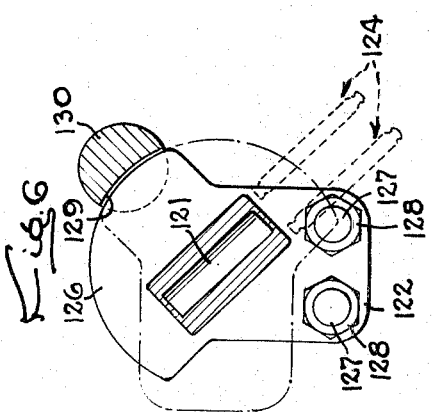
INVENTOR
Samuel Luzaich
by Wolfe, Hubbard, Voit & Osann
ATTORNEY

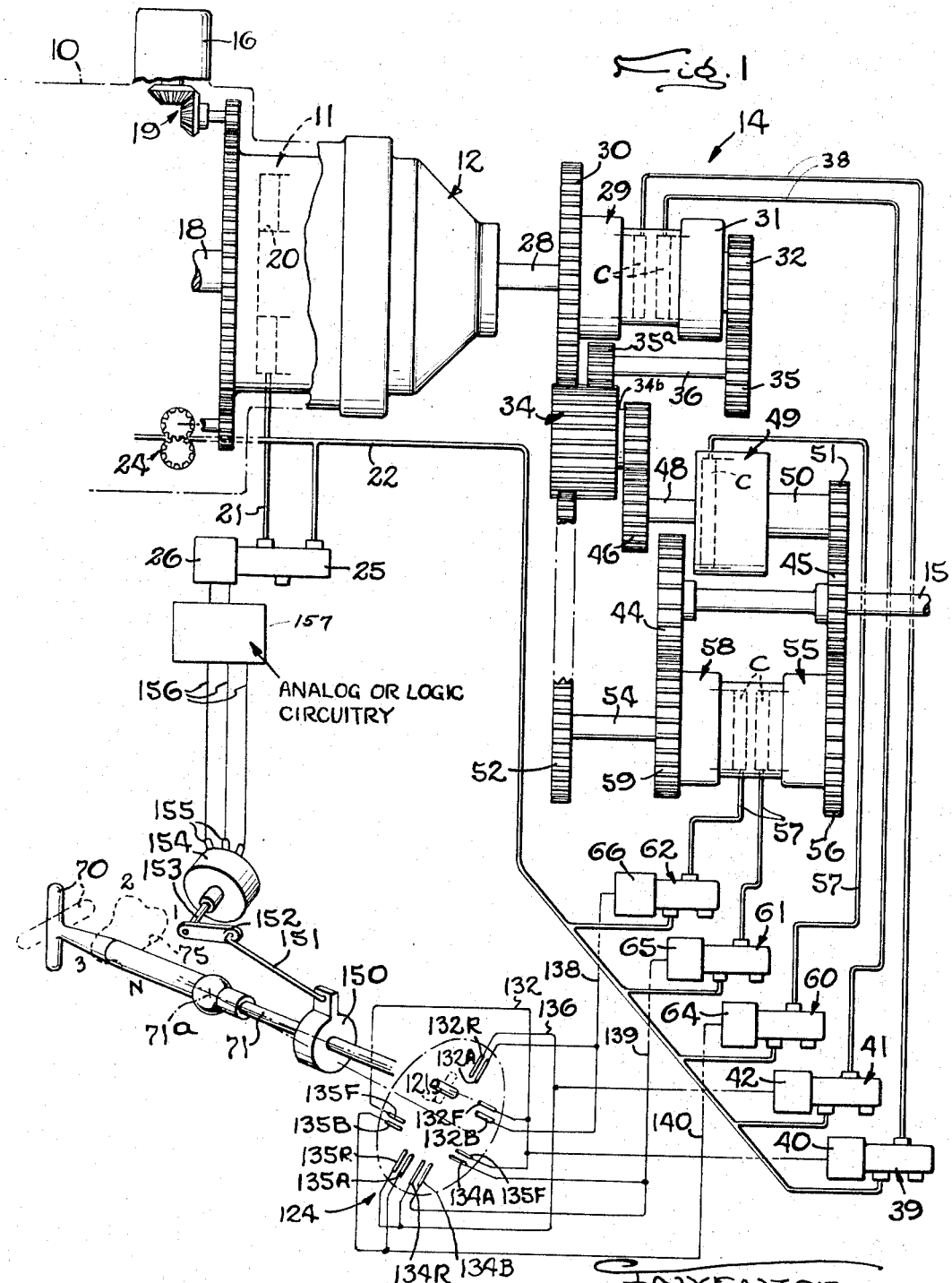

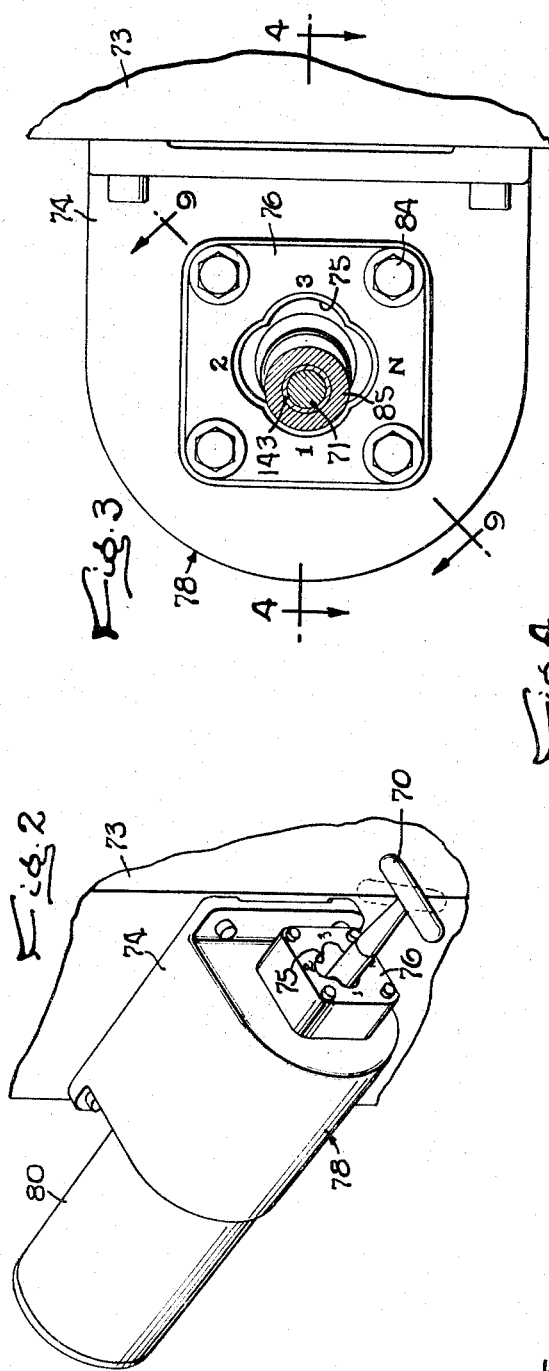

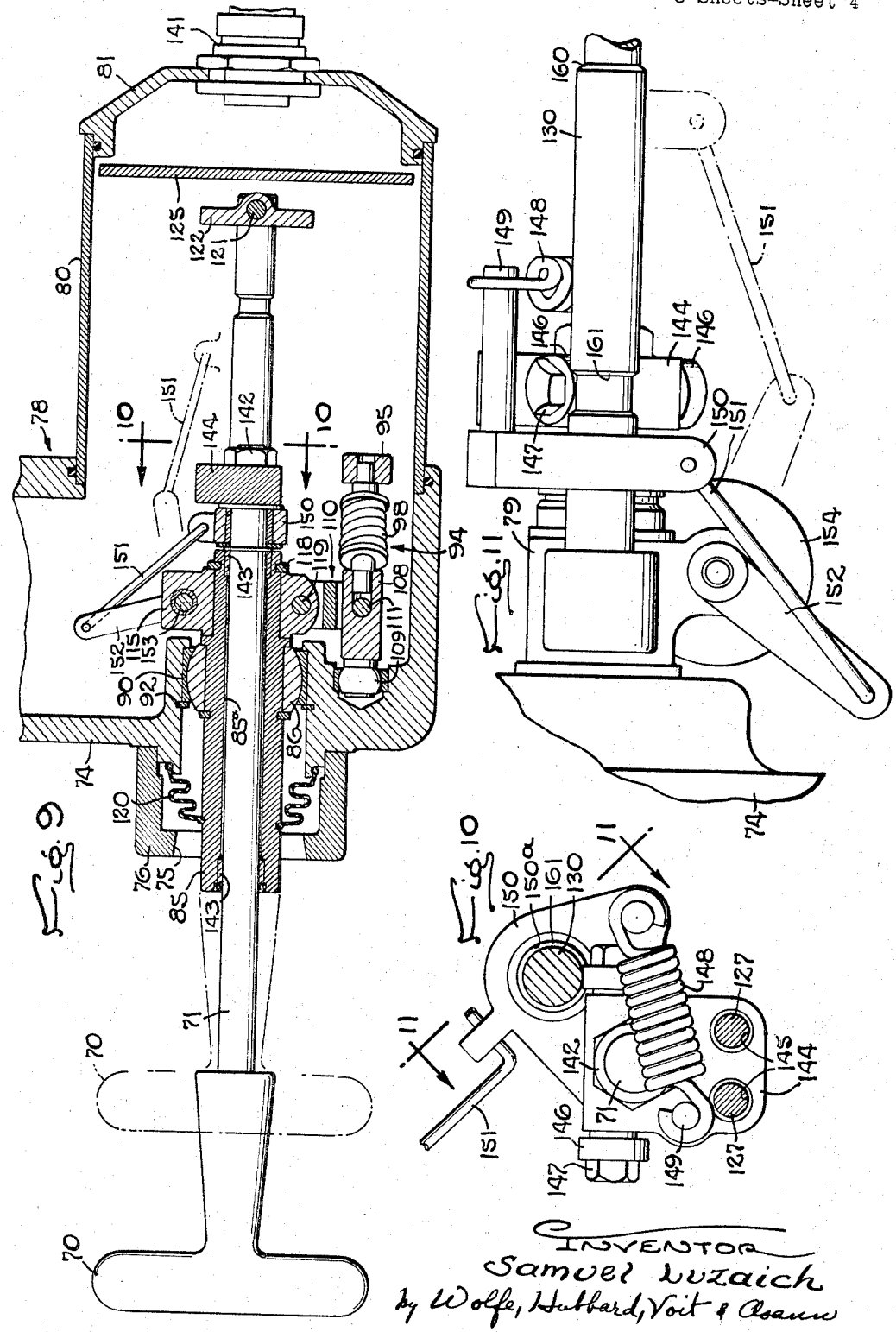

INVENTOR
Samuel Luzaich
by Wolfe, Hubbard, Voit & Osann
ATTORNEY

United States Patent Office 3,322,247
Patented May 30, 1967

3,322,247
TRANSMISSION AND CLUTCH WITH SINGLE CONTROL
Samuel Luzaich, Rockford, Ill., assignor to Twin Disc Clutch Company, Racine, Wis., a corporation of Wisconsin
Filed July 19, 1965, Ser. No. 473,123
7 Claims. (Cl. 192—3.5)

This invention relates to a control mechanism for regulating the various power functions of a power system, and more particularly to such a mechanism for regulating the speed, drive ratio and drive direction of a vehicle, such as a bulldozer.

In maneuvering bulldozers or similar type vehicles, the operator is heavily taxed to manipulate all the controls for regulating the ground speed and guiding the vehicle, in addition to regulating simultaneously the various auxiliary drives such as those for raising and lowering the blade of a bulldozer or adjusting the height of the scraper of a self-loading earth hauler. He must not only control these several power functions of the vehicle, but must do so while being bounced around as the vehicle moves over the very rough ground usually present at the work site. Also, he must manipulate the controls for the most part while not looking at them, since he must constantly watch the position of the blade or scraper with respect to grade markers and the like by which the work must be guided, making the gear shifting and driving of the vehicle even more difficult.

As disclosed in the co-pending application of Conrad R. Hilpert, No. 473,122, filed July 19, 1965, there has been developed a control mechanism with which the operator, by moving a single handle supported on a control rod, can regulate a plurality of drive functions of a bulldozer or the like. For instance, as explained in that application, the operator by pivoting, rotating and pushing or pulling on the handle can regulate the drive ratio, drive direction and speed of the vehicle.

The general object of this invention is to provide a single and compact mechanism for generating signals indicative of the position of such a control handle which is movable in several different ways, which may be used for regulating a power drive system.

A more specific object of this invention is to provide a simple and compact mechanism for generating separate signals indicative of the pivoting positioning, the rotary positioning, and the longitudinal positioning of the handle and supporting rod, for adjusting specific operating conditions of the power drive system for a bulldozer.

Figure 12:
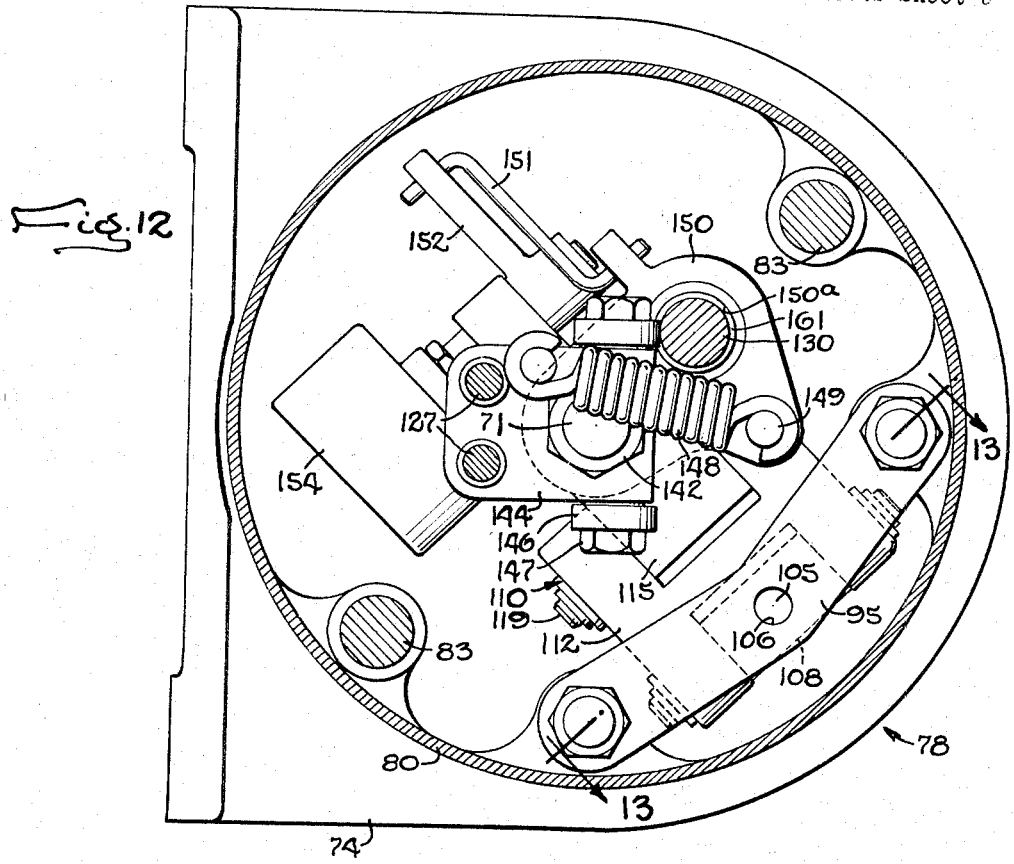
Figure 13:
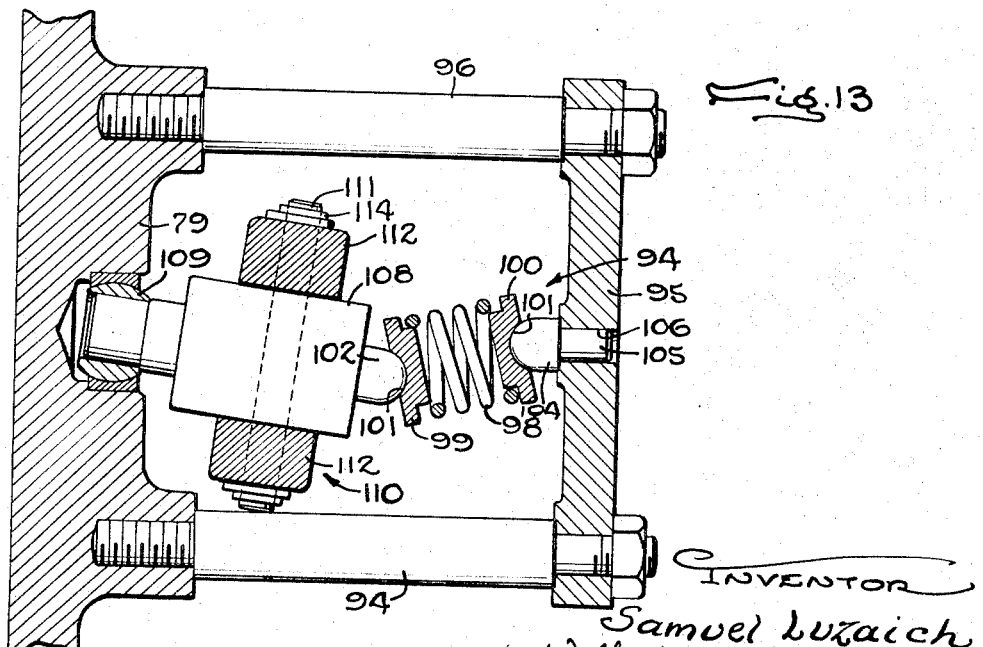

In the drawings:
FIGURE 1 is a fragmentary view of a power system with which the control mechanism may be used showing the control mechanism in fragmentary perspective view and showing the power drive system of a bulldozer in schematic form,
FIG. 2 is a perspective view of the control mechanism showing the positions to which the handle may be rotated,
FIG. 3 is a view along the line 3—3 of FIG. 4,
FIG. 4 is a cross-sectional view of the control mechanism along the line 4—4 of FIG. 3,
FIG. 5 is a cross-sectional view along the line 5—5 of FIG. 4,
FIG. 6 is a cross-sectional view along the line 6—6 of FIG. 5,
FIG. 7 is a cross-sectional view along the line 7—7 of FIG. 5 showing the positions of the magnet in dotted and dot-dash outline as the handle is pivoted into the various forward drive ratio positions,
FIG. 8 is a view similar to FIG. 7 showing the positions of the magnet in dotted and dot-dash outline as the handle is pivoted into the various reverse drive ratio positions.
FIG. 9 is a cross-sectional view along the line 9—9 of FIG. 3 showing the range of movement of the mechanism for adjusting the potentiometer as the handle is pushed and pulled to set the speed of the driven shaft,
FIG. 10 is an enlarged cross-sectional view along the line 10—10 of FIG. 9,
FIG. 11 is a cross-sectional view along the line 11—11 of FIG. 10 again showing the moved potentiometer arm in dotted outline,
FIG. 12 is an enlarged cross-sectional view of the mechanism along the line 12—12 of FIG. 5, and
FIG. 13 is a view of the over-center positioning mechanism along the line 13—13 of FIG. 12.

In FIG. 1 is shown a power system for driving a load (not shown) including a prime mover or engine 10 connected to a drive train which includes a primary clutch 11, a torque convertor 12 and a multi-ratio reversible drive transmission 14, all connected in tandem for driving the load through an output shaft 15. The engine preferably is a constant speed type, controlled by a governor 16 regulating the fuel input thereto and connected to be driven by the output shaft 18 of the engine through a gear train 19.

The clutch 11 is a modulated type clutch which is well known and which may be operated continuously at any degree of slippage to provide speed variation of the drive train powered by the constant speed engine 10. The clutch is engaged by introduction of pressure fluid into a cavity 20 which results in a force proportional to the pressure of the fluid in the cavity being exerted to urge the clutch plates (not shown) together, with one set of plates being drivingly connected with the output shaft 18 of the engine and the other set being connected with the torque convertor 12. Pressure fluid for engaging the clutch is supplied through hydraulic lines 22 and 21 leading from an engine driven hydraulic pump 24. A modulating valve 25 connects these lines for regulating the pressure of the fluid transmittied to the clutch. This modulating valve is actuated by an electric solenoid 26, with the degree of actuation, or opening of the valve, dependent upon the degree of energization of the solenoid. The torque converter 12 functions to cushion the shock inherent in connecting and disconnecting the load and the engine and preferably includes at least two rotating vane assemblies (not shown) which transmit torque therebetween by propelling hydraulic fluid from one to the other, with one vane assembly being driven by clutch 11 and the other being drivingly connected to an output shaft 28.

The transmission 14 permits selection of the drive direction and the gear ratio of the drive connection between the torque convertor output shaft 28 and the power system output shaft 15. In this instance forward and reverse drive gear trains are in series drive connection with three drive ratio gear trains, making it possible to power the output shaft in forward or reverse drive direction an any one of three drive ratios. Specifically, the transmission connects with the shaft 28 through a forward drive clutch 29 forming a driving connection with an input gear 30, and a reverse drive clutch 31 forming a driving connection with an input gear 32. For forward drive, the clutch 29 is engaged to drive a compound idler gear 34 in the forward direction directly from the shaft 28 through the input gear 30, the gear 34 being fast on a shaft 34b. For reverse drive, the clutch 31 is engaged to drive the gear 32 which, through intermediate reversing gears 35 and 35a fixed on a layshaft 36, drives the idler gear 34 in the reverse direction. Pressure fluid is supplied to clutch cavities C through pressure line 38 connecting with the pressured fluid line 22 for engaging these clutches, with the flow to clutch 29 being controlled by a valve 39 actuated by the energization of a solenoid coil 40 and the flow to clutch 32 being controlled by a valve 41 actuated by energization of a solenoid coil 42.

Three parallel gear trains connect the idler gear 34 to output gears 44 and 45 which are attached to the output shaft 15 and which may selectively engaged to establish first, second and third drive ratios. The first such drive train includes an intermediate gear 46 meshing with the idler gear 34 on a layshaft 48 and placed in driving connection with a shaft 50 and a gear 51 meshing with the output gear 45 by engagement of a clutch 49. The second drive train includes an intermediate gear 52 meshing with the idler gear 34 and driving a layshaft 54 which, by engagement of a clutch 55, is placed in driving engagement with a gear 56 driving the output gear 45. The third drive train includes the gear 52 driving a layshaft 54 which by engagement of a clutch 58, powers a gear 59 in driving engagement with the output gear 44. The clutches 49, 55 and 58 are engaged by the introduction of pressure fluid from the line 22 through lines 57 and into cavities C of the individual clutches, with the flow of pressure fluid being controlled by valves 60, 61 and 62 actuated by the energization of solenoid coils 64, 65 and 66 respectively, to complete the first, second or third transmission drive ratios.

To regulate the power drive system heretofore described, a single control handle 70 connected to a control rod 71, in conveniently positioned to be grasped in one hand by the operator and moved to various positions to set the drive ratio and drive direction of the transmission and set the degree of engagement of the modulated clutch. The control handle is preferably positioned directly in front of the operator, such as by mounting it on a pedestal 73 in front of the driver's seat for ease of moving the handle in the various positions. The handle 70 and supporting rod 71 is mounted on a support member 74 such that the rod can be pivoted to one of several positions within an aperture 75 in a plate 76 to set the transmission in a corresponding drive ratio, rotated 90 degrees between the two positions shown in FIG. 2 to shift the transmission into either forward or reverse drive, and pulled and pushed between the limit positions shown in FIG. 9 to set the speed of the output shaft, with means provided within a housing 78 to detect the position of the rod 71 and generate control signals for regulation of the power drive system in response to such positioning of the handle.

The present invention contemplates the provisions of a comparatively simple and compact construction and mounting of the control rod 71 to obtain the three desired movements, namely, turning, pivoting and endwise shifting, together with a novel arrangement for producing signals responsive to these movements.

Thus for shifting the drive ratio of the multi-ratio transmission 14, the operator swivels the handle 70 and supporting rod 71 to positions corresponding to first, second and third drive ratios (see FIGS. 2, 3, and 4), and a neutral position where the engine and load are disconnected. To these ends, the rod 71 is supported for a swivel movement within a support 74 in a housing 78, mounted on a post 73, with the housing comprising a bushing support member 79, a drum 80 and an end bell 81 fastened together by suitable means such as by rods 83 extending between the bushing support member and the end bell. A sleeve 85 supports the rod for movement within a center opening 82 in the bushing support and an aperture 75 in an aperture plate 76 attached to the bushing support by bolts 84. The rod is also supported for independent sliding movement within the center opening 85a of the sleeve.

The sleeve 85 is supported on a spherical shaped ball bushing 86 held between a shoulder 88 and a snapring 89, and in turn supported in the opening 82 on a bushing mount 90 held between a shoulder 91 and a snapring 92. This bushing mount 90 is formed to interfit with the spherical outer surface of the bushing 86 and permit a swivel movement of the rod 71 and supporting sleeve 85 by movement of the bushing within this cooperating mount (as shown in FIG. 4). The control handle is limited to movement to the positions determined by the configuration of the aperture 75 in the plate 76, and in this instance these positions, are first, second, third and neutral gear ratios corresponding with the drive ratio capabilities of the multi-ratio transmission 14 heretofore described. Where a swivel movement is described, in some instances the rod may need only to be pivoted in one plane depending upon the requirements of the power system.

The handle is held in whichever of the four positions it is pivoted to by an over-center spring mechanism 94 (shown primarily in FIGS. 4, 9, 12 and 13). This spring mechanism is mounted within the housing 78 between a member 95 attached to the bushing support 79 by spacer bolts 96, and the bushing support. A spring 98 is compressed between two washers 99 and 100, with each washer including an outward facing recess 101 in which pivot pins 102 and 104 seat. Pin 104 is fixed directly to the support 95 by an attached stud 105 being seated in a well 106 in the support, while pin 102 is attached to a connector 108 which in turn is coupled to the bushing support 79 through a balljoint 109. As shown in FIG. 13, the force of the compressed spring 98 acting against the washers 99 and 100 is constantly opposing alinement of the pivot pins 102 and 104 by biasing pin 102 to one side or the other of an axis of the spring mechanism joining the centers of the balljoint 109 and the pivot pin 104.

A pivot link 110 is attached to the connector 108 by a pin 111 extending through the connector and both legs 112 of the link, with lockwashers 114 on each end of the pin holding it in place. The other end of this pivot link is coupled to a collar 115 extending around the inner end of sleeve 85 and held between the shoulder 88 and a snapring 118 on the sleeve. A pin 119 positioned parallel to pin 111 passes through alined openings in the collar and link 110 to pivotally couple the spring mechanism to the sleeve 85. By reason of the collar 115 being spaced along the sleeve from the bushing 86 supporting the sleeve 85, and the fact that the axis of the spring mechanism is parallel to the sleeve when the sleeve is in the center position the lateral force exerted by the spring 98 on the connector 108 is transmitted through the pivot link 110 and sleeve to the rod 71. The spring 98 thus spring loads the rod to one side or the other of the center position within the ball bushing to hold it in any of the radially located positions of the aperture 75 to which it is moved in selecting a transmission gear ratio. A flexible boot 120 extending around the sleeve 85 and attached to the bushing support 79 prevents dust from entering the housing 78 as the rod 71 and sleeve are pivoted.

To sense the position of the handle and rod, a magnet 121 is supported on plate 122 for movement with the pivoted end of the rod 71 which functions to actuate selected one of a series of magnetic reed switches 124 (shown in dotted outline in FIGS. 6, 7 and 8) supported on a stationary plate 125 adjacent the arcuate path of the magnet when the magnet is moved close and alined thereto. The magnet 121 is supported on the plate 122 which is secured at one side to the end of rods 127 by threaded nuts 128 (see FIGS. 5 and 6). The opposite edge 126 of the magnet plate 122 fits into a groove 129 in a fixed guide rod 130 which is attached to the collar 115 on sleeve 85. By this arrangement, the magnet is moved along an arcuate path to one of the quadrants of movement as the rod 71 is swiveled within the aperture 75 to select one of the gear ratios of the transmission.

To sense the position of the magnet and thereby sense the pivoted positioning of the rod 71, the magnetic reed switches 124 are secured adjacent the quadrants of movement of the rod end onto the plate 125 which in turn is suported on rods 83. The specific details of these switches are not shown in the drawings since they are widely used, however they each generally comprise a pair of flexible contact arms attached at opposite end to the end walls of a non-magnetic cylindrical housing, usually glass, with the unsupported ends in spaced over-lapping relationship. These arms are made of magnetic material such that, when a magnet is brought close to the switch and alined to establish a flux field running lengthwise of the contact arms, a portion of the flux is diverted to pass lengthwise through the arms since the magnetic material offers a low reluctance path in comparison to the air. As this flux passes between the arms, a force is created therebetween since the field in the arm nearest the magnet naturally is greater. If the field is sufficiently strong, the force will be sufficient to bend the over-lapping of the arms together and cause them to touch. An electrical circuit attached across the supported ends of the contacts is closed when these arms touch. On the other hand, if a magnet is brought close to a reed switch put positioned so the flux field lines extend normal to the contact arms, no attraction between the arms is created since the flux field passing through each arm is substantially equal, and the switch will not be closed.

As shown in FIGS. 1, 7 and 8, two pairs of magnetic switches are positioned at each quadrant of movement of the inner end of rod 71. Reading clockwise, switches 132R, 132A, 132F and 132B are positioned in the third gear ratio quadrant, switches 134F, 134A, 134B and 134R in the second gear ratio quadrant, and switches 135A, 135R, 135B and 135F in the first gear ratio quadrant. As shown in FIG. 1, switches 132F, 134F and 135F are connected by the electrical conductor 132 to solenoid 40 of the control valve 39 which controls the flow of pressure fluid to the forward drive clutch 29. Similarly, switches 132R, 134R and 135R are connected by conductor 136 to solenoid 42 of valve 41 controlling the flow of pressure fluid to the reverse drive clutch 31. In the same manner, switches 132A and 132B, 134A and 134B, and 135A and 135B are connected to solenoids 66, 65, and 64, respectively, by conductors 138, 139, 140. A source of electrical power (not shown) is connected to the inner terminal of each reed switch such that closing of the switch will result in energizing the solenoid connected to that respective switch. All of the conductors connected with the reed switches pass out of the housing 78 through a receptacle 141 in the end bell 81.

By this arrangement, swiveled movement of the handle 70 to position the rod 71 in one of the quadrants will position the magnet 121 in the related quadrant (opposite to that of the handle since the rod is swiveled near the midpoint on the bushing 86) to close the reed switches in close proximity to and alined with the magnet. Alinement is necessary since, as heretofore explained, the reed switch must be approximately in line with the lines of flux of the magnetic field created by the magnet before the arms are drawn together.

At each quadrant are two parallel connected drive ratio switches 132A and 132B, 134A and 134B and 135A and 135B, with the switches in each pair positioned at right angles to each other. By this arrangement, movement of the magnet to any quadrant, regardless of the rotary positioning of the magnet (since as will be explained hereinafter the magnet can be positioned at any of the quadrants in either of the angular positions shown in FIGS. 7 or 8), will close one of the drive ratio switches at that quadrant to thereby effect energization of the related solenoid for opening the associated control valve and, by the introduction of pressure fluid to the corresponding clutch, shift the transmission to the corresponding drive ratio. While reed switches are not shown as being located at the neutral position since, in the absence of pressure fluid being transmitted to the transmission none of the transmission clutches is engaged to set the transmission in a drive ratio, they may be in the neutral postion to function for other purposes, if desired.

In operation, to shift the transmission to the first drive ratio the handle 70 is moved to swivel the rod 71 to the first drive ratio positon (as shown in FIGS. 3 and 7) which positions the magnet 121 in one of the dotted line positions shown in FIGS. 7 and 8. The magnet thus positioned will close switch 135B or 135A to thereby complete the electrical circuit through conductor 140 and effect energization of solenoid 64. Valve 60 is thereby opened to supply pressure fluid for engagement of clutch 49 to set the transmission in the first drive ratio. Similarly, clutches 55 and 58 can be engaged to set the transmission in the second and third drive ratios by positioning the magnet to aline with and close one of the swtches 134A and 134B or 132A and 132B, respectively.

The transmission also may be shifted to forward or reverse drive ratio by twisting the control handle 70 to one of the two positions shown in FIG. 2. By this arrangement, the drive ratio of the transmission may be selected by pivoting the handle to one quadrant of movement and the drive direction may be selected by turning the handle to one of two positions corresponding to forward and reverse drive. To permit turning of the handle 70, the rod 71 is supported by bushings 143 positioned at the ends of the center opening 85a in the sleeve 85 such that the shaft and sleeve may be swiveled together, and the shaft may also be moved relative to the sleeve. Attached by a nut 142 to the inner end of the shaft 71 is a follower 144 (FIGS. 5, 10, and 12) with a pair of openings 145 extending therethrough in which the two rods 127 slidably fit. By this arrangement, swiveling of the handle 70 in turn swivels the rod 71, the follower 144 and the rods 127 with the attached magnet plate 122 about the bushing 86. The plate 122 may also be turned in its own plane by rotation of the rod 71 between two positions approximately 90 degrees apart, with the limits of such turning being set by contact between rollers 146, rotatably supported on the follower 144 by bolts 147, and the rod 130 secured to the bracket 115 as described before. The plate 122 slidably fits within the groove 129 in the slide rod to hold it against axial movement relative to the slide rod (FIGS. 5 and 6). A spring 148 supported between posts 149 secured to the follower 150 and the follower 144 forms an over-center mechanism to hold the follower and handle in either of the two rotated positions.

The rod 71, sleeve 85, rod 130 and supported magnet plate 122 may thereby be swiveled into any quadrant to set the drive ratio of the transmission, and the handle thereafter twisted between the forward and reverse positions (as shown in FIG. 2) to set the drive direction. For sensing the angular positioning of the magnet, a pair of corresponding drive ratio reed switches are positioned in each drive ratio selection quadrant at 90 degrees to each other as explained before with a forward drive reed switch positioned adjacent and parallel to one drive ratio switch and a reverse drive reed switch positioned adjacent and parallel to the other drive ratio switch. By turning the handle 70, that is, turning the handle to either the vertical (forward drive) position which alines the magnet as shown in the dotted lines in FIG. 7, or turning the handle 70 to the horizontal (reverse drive) position which alines the magnets as shown in FIG. 8, a forward or reverse direction reed switch is closed in addition to the drive ratio reed switch to cause engagement of the transmission clutches in a corresponding pattern.

In operation, after moving the handle 70 to the first drive ratio position to locate the magnet 121 as illustrated by the dotted outline shown in FIGS. 7 and 8, the handle may be twisted to the vertical position to select forward drive direction (at this time the magnet will be positioned as shown in FIG. 7) to thereby close switches 135F and 135B. Solenoids 64 and 40 are thus energized by completion of the electrical circuits through conductors 132 and 140, respectively, to open valves 60 and 39 and introduce pressure fluid to clutches 49 and 29. The transmission is thereby set to the first forward drive ratio corresponding to the positioning of the handle 70. To drive the vehicle in reverse, the handle may be rotated to the horizontal position (while not disturbing the pivotal positioning thereof) to move the magnet to the dotted line position of FIG. 8, switches 135R and 135A are now closed by the magnet, with all other switches being open, to energize solenoids 42 and 64, open valves 41 and 60 and engage clutches 31 and 49 to set the transmission to the first reverse drive ratio corresponding to the positioning of the handle.

The speed of the vehicle also can be varied by moving the handle 70 in and out to longitudinally position the rod 71, while leaving uneffected the pivotal and rotational location thereof which already has been positioned for selecting the drive ratio and drive direction of the vehicle. As explained before, the rod 71 is movable within the sleeve 85, and therefore may be slid longitudinally by pushing and pulling on the handle. In FIGS. 9 and 11 are shown the limits of longitudinal movement of the rod as it is pushed and pulled. The slide follower 150 is guided by the slide rod 130, since the rod passes through an opening 150a in the follower. Pivotally attached to the slide follower is a link 151 connecting with an arm 152. This arm 152 is fixed to a shaft 153 of a potentiometer 154 supported on the bracket 115. Longitudinal movement of the slide follower 150 and connecting link 151 thus rotates the arm 152 to position the shaft 153 radially, with the radial positioning thereof corresponding to the *in* and *out* positioning of the handle 70.

Connecting to the terminals 155 of the potentiometer are electrical conductors 156 leading to a control box 157. A source of electrical power is also connected to the control box 157 in a manner well known, such that by varying the setting of potentiometer 154 the energization of the modulating actuator is adjusted to thereby adjust the valve 25 controlling the pressure of fluid passing to the modulated clutch. Other control signals may also be fed into the control to modify the signal fed to the modulating actuator from the potentiometer, as desired. In this manner the degree of engagement of the modulated clutch is set by pushing and pulling on the handle to longitudinally position the rod 71, and the control operates such that pulling out on the handle 70, that is, moving the handle away from the housing 72 to the solid line position shown in FIG. 9, engages the modulated clutch, while movement of the handle to the dotted line position shown progressively disengages the modulated clutch. As the clutch is engaged the vehicle speed increases until a full speed condition for the drive ratio to which the transmission is set is reached when the handle is set at the solid line position in FIG. 9.

To limit the longitudinal movement of the handle, grooves 160 and 161 are arranged on the rod 130 at each limit of movement of the follower 150 which, when engaged by one or the other of the rollers 146 will seat the rollers sufficiently to lock the rod 71 in the *in* or *out* position corresponding to the full speed or stopped position of the handle. The speed of the vehicle also can be varied in other ways, such as by regulating the fuel input to the engine in response to the same *in* and *out* movement of the handle.

By this control, the operator may independently set the drive direction and the drive ratio of the transmission by turning the handle and pushing it to one side to swivel it to a drive selection position respectively, where it remains under force of the spring mechanisms. With the handle set in any of these positions he may speed up or slow the vehicle according to the requirements of the work being accomplished by manipulating the single handle of the control described herein. Naturally, where only three drive ratio positions are described, by merely changing the aperture plate 76 and repositioning the reed switches on the plate 125, transmissions having more or fewer drive ratios can be regulated by the same basic control mechanism.

I claim as my invention:

1. A control mechanism for manual operation to regulate a power system for driving a load, said power system including a prime mover drivingly connected to the load through a tandem connected modulated clutch and a multi-drive ratio reversible-drive transmission, said transmission including a first plurality of clutches adapted to be engaged and set said transmission in the various drive ratios and a second plurality of clutches adapted to be engaged and set said transmission in forward and reverse drive direction, said control mechanism comprising a control rod, means supporting said rod for longitudinal movement between predetermined limits and swivel movement to a plurality of positions each corresponding to a different drive ratio of the transmission and rotary movement between first and second positions, a handle attached to said rod and positioned to be manually pushed, pulled, rotated, and moved to move said rod into said plurality of positions, a modulating actuator for engaging said modulated clutch to a degree proportional to the energization thereof, a potentiometer connected to energize said modulating actuator and including means connected to said rod for adjusting the voltage output therefrom in proportion to the longitudinal positioning of the rod, a first plurality of actuators adapted when energized in patterns to engage said transmission drive-ratio clutches and set the transmission in the various drive ratios, a first plurality of reed switches positioned adjacent position of swivel movement of the end of said rod, opposite the handle, a magnet supported to move with said opposite end of said rod and close the reed switches at each position of swiveled movement of said rod when positioned adjacent thereto, circuit means connecting said reed switches and said first actuators for energizing the actuators in patterns when predetermined reed switches are closed to set said transmission in the drive ratio corresponding to the pivotal positioning of said rod, a second plurality of actuators adapted to be energized in patterns to engage said transmission drive direction clutches, a second plurality of reed switches adjacent each position of swivel movement of said rod with selected ones of said second reed switches positioned to close as said rod is rotated to said first and second rotary positions while at that swiveled position, circuit means connecting said second reed switches and said second actuators for energizing the actuators in patterns when predetermined reed switches are closed to set said transmission in forward and reverse drive directions, and spring means to hold said rod in each swivel and rotary position it is moved whereby the clutch engagement is varied by pushing and pulling on the handle, the drive ratio of the transmission is set by swiveling the handle and the drive direction is set by rotating said handle.

2. A control mechanism for manual operation to regulate a power drive system for driving a load, said power system including a prime mover drivingly connected to the load through a modulated clutch and a multi-drive-ratio reversible-drive transmission including a plurality of clutches adapted to be engaged and set said transmission in the various drive ratios and drive directions, said control mechanism comprising, a control rod, means supporting said rod for longitudinal movement thereof between predetermined limits and swivel movement to a plurality of positions each corresponding to one of the drive ratios of the transmission and rotary movement between first and second positions, a modulating actuator for engaging said modulated clutch when energized and to a degree proportional to the degree of energization, a source of electrical power, a potentiometer including means operatively connected to said rod to adjust said potentiometer in proportion to longitudinal movement of said rod, and an electrical circuit connecting said source, said potentiometer and said modulating actuator to thus engage the modulated clutch proportionally to longitudinal movement of the rod, a first plurality of actuators for engaging respective ones of the drive ratio clutches when energized, a first plurality of electric switches positioned to be closed in predetermined patterns when said rod is swiveled to each drive ratio selection position, an electrical circuit connecting said source, said first electric switches, and said first actuators in predetermined order to engage selected drive ratio clutches as the rod is swiveled to each position, to set the transmission in the drive ratio corresponding to the pivotal positioning of said rod, a second plurality of actuators for engaging respective ones of the drive ratio clutches when energized, a second plurality of electric switches positioned to be selectively closed when said rod is rotated to the first and second positions, and circuit means connecting said source, said second actuators and said second electric switches in predetermined order for engaging respective ones of the drive direction clutches when said switches are closed and thus set the transmission in forward or reverse drive corresponding to the rotary positioning the rod, whereby the clutch engagement is varied by pushing and pulling on the handle, the drive ratio set by moving the handle to preselected positions and the drive direction selected by twisting the handle.

3. A control mechanism for manual operation to regulate a power drive system for driving a load, said power drive system including a prime mover drivingly connected to the load through a modulated clutch and a multi-drive ratio transmission, said control mechanism comprising, a control rod, a support for said rod including means permitting longitudinal movement of the rod between predetermined limits and pivotal movement of the rod to a plurality of positions each corresponding to a different drive ratio of the transmission, a handle attached to said rod and positioned to be manually pushed, pulled and pivoted to move the rod to said plurality of positions, a modulating actuator for engaging said modulated clutch to a degree proportional to the energization thereof, a source of electric power, an electric current regulator including means for adjusting the current flow therethrough in proportion to the longitudinal positioning of said rod with the current flow therethrough being stopped when the handle and rod are pushed inward to the limit position and current flow therethrough being at a maximum when the handle and rod are pulled outward to the opposite limit position, circuit means connecting the source, current regulator and modulating actuator, an electric switch position at each pivoted position of the rod including means for actuating the switch to the closed position when the rod is pivoted to that respective position, an electric actuator for setting the transmission to each of the drive ratios, and circuit means connecting the source, each switch and the corresponding actuator whereby movement of the rod to a drive ratio position will set the transmission to the corresponding drive ratio and pulling out on the handle will proportionally engage the modulated clutch for driving the load in that drive ratio.

4. A control mechanism for manual operation to regulate a power drive system for driving a load, said power drive system including a prime mover drivingly connected to the load through a modulated clutch and a reversible-drive transmission, said control mechanism comprising, a control rod, a support for said rod including means permitting longitudinal movement of the rod between predetermined limits and rotation of the rod between first and second positions, a handle attached to said rod and positioned to be manually pushed, pulled and rotated, a modulating actuator for engaging said modulated clutch to a degree proportional to the energization thereof, a source of electric power, an electric current regulator including means for adjusting the current flow therethrough in proportion to the longitudinal positioning of said rod with the current flow therethrough being stopped when the handle and rod are pushed into a limit position and current flow therethrough being at a maximum when the handle and rod are pulled to the opposite limit position, circuit means connecting the source, current regulator and modulating actuator, an electric switch positioned at the first and second positions of the rod including means for closing the switch when the rod is rotated to the respective position, and electric actuator for setting the transmission in the forward and reverse drive positions, and circuit means connecting the electric switches and electric actuator in predetermined order with the power source whereby the transmission can be shifted to forward and reverse drive by rotating the handle and the modulated clutch can be proportionally engaged and disengaged by pulling and pushing on the handle.

5. A control mechanism for manual operation to regulate a power drive system for driving a load, said power drive system including a prime mover drivingly connected to the load through a multi-drive-ratio reversible-drive transmission, said control mechanism comprising, a control rod, means supporting said rod for pivotal movement thereof to a plurality of positions each corresponding to a different drive ratio of the transmission and also permitting rotary movement of the rod between a first and second position, a handle attached to said rod and located to be moved and rotated manually, a source of electric power, a first actuator for setting the transmission into each of the drive ratios, a first plurality of electric switches positioned to be closed in predetermined patterns as the rod is pivoted to each drive ratio position, and circuit means connecting the source, each actuator and the respective patterns of switches, a second actuator for setting the transmission into the forward and reverse drive directions, a second plurality of switches positioned to be closed in predetermined patterns as the rod is rotated to the first and second positions, and circuit means connecting the source, second actuator and respective patterns of said second switches whereby rotation of the handle and rod sets the transmission in the forward and reverse drive and moving the handle to pivot the rod sets the transmission in the various drive ranges.

6. A control mechanism for manual operation to regulate a power drive system for driving a load, said power drive system including a prime mover drivingly connected to the load through a multi-drive-ratio transmission, said control mechanism comprising, a control rod, means supporting said rod for pivotal movement thereof to a plurality of positions, a plate positioned normal to the rod and spaced along the rod from said support and including an aperture through which the rod passes, said aperture including a plurality of distinct positions to which the rod may be pivoted with each position corresponding to a different drive ratio of the transmission, a handle attached to one end of the rod and positioned to be moved manually, a spring for holding the rod in each position in the aperture it is moved, a magnet supported on the rod end opposite to the handle, a plurality of reed switches arranged adjacent the path of movement of the magnet as the rod is pivoted and positioned to be actuated by the magnet field in predetermined patterns as the rod is pivoted to each drive ratio position, an electric actuator for shifting the transmission to the various drive ratios, a source of electric power, and circuit means connecting the patterns of reed switches, power source and actuator whereby movement of the rod to each drive ratio position will shift the transmission to the corresponding drive ratio.

7. A control mechanism for manual operation of a multi-ratio transmission drivingly interposed between a prime mover and the load, said transmission having a plurality of actuators adapted to be energized in different patterns to set the transmission in various drive ratios, said mechanism comprising, a control rod, means supporting said control rod positioned intermediate the ends of the rod for pivoted movement thereof, a handle on one end of said rod positioned to be moved manually, a magnet supported on the opposite end of said rod, a plate positioned longitudinally along the rod from the support and having an aperture through which the rod extends to limit the pivotal movement of the rod to predetermined positions corresponding to the drive ratios of the transmission, releasable means for holding the rod in each position it is moved, and sensors positioned at said predetermined positions and activated by said magnet being moved close thereto including means to energize said actuators in a pattern to set the transmissions to a drive ratio corresponding to the positioning of said rod.

References Cited

UNITED STATES PATENTS

| 2,202,866 | 6/1940 | Price. | |
| 3,061,058 | 10/1962 | Barth | 192—3.5 |
| 3,205,983 | 9/1965 | Chivsa | 192—3.5 |

FOREIGN PATENTS 569,136  5/1945  Great Britain.

BENJAMIN W. WYCHE, III, *Primary Examiner.*